United States Patent [19]

Sorensen

[11] Patent Number: 5,370,834
[45] Date of Patent: Dec. 6, 1994

[54] METHOD AND APPARATUS FOR THE PRODUCTION OF A THERMOPLASTIC CONTAINER FROM A PREFORM

[75] Inventor: Erling Sorensen, Odense, Denmark

[73] Assignee: A/S Plm Haustrup Holding, Odense C., Denmark

[21] Appl. No.: 946,350

[22] PCT Filed: Mar. 4, 1991

[86] PCT No.: PCT/SE91/00169
§ 371 Date: Nov. 2, 1992
§ 102(e) Date: Nov. 2, 1992

[87] PCT Pub. No.: WO91/12951
PCT Pub. Date: Sep. 5, 1991

[30] Foreign Application Priority Data
Mar. 2, 1990 [SE] Sweden .................. 9000741

[51] Int. Cl.[5] .................. B29C 61/02; B29C 49/02
[52] U.S. Cl. .................. 264/230; 264/294; 264/534; 425/384; 425/387.1; 425/403; 425/526
[58] Field of Search .................. 264/230, 534, 342 R, 264/530, 529, 294; 425/526, 529, 522, 324.1, 384, 387.1, 403

[56] References Cited

U.S. PATENT DOCUMENTS

| | | | |
|---|---|---|---|
| 4,482,518 | 11/1984 | Brady, Jr. .................. | 264/230 |
| 4,496,517 | 1/1985 | Kinoshita et al. . | |
| 4,524,045 | 6/1985 | Hayashi et al. . | |
| 4,704,243 | 11/1987 | Nilsson et al. .................. | 264/534 |
| 4,836,971 | 6/1989 | Denis et al. . | |
| 4,867,929 | 9/1989 | Albrecht et al. .................. | 264/534 |
| 5,122,327 | 6/1992 | Spina et al. .................. | 264/230 |
| 5,198,176 | 3/1993 | Fortin .................. | 264/230 |

FOREIGN PATENT DOCUMENTS

| | | | |
|---|---|---|---|
| 0234301 | 9/1987 | European Pat. Off. . | |
| 56-164817 | 12/1981 | Japan .................. | 264/230 |
| 59-078824 | 5/1984 | Japan .................. | 264/342 R |

Primary Examiner—Catherine Timm
Attorney, Agent, or Firm—Keck, Mahin & Cate

[57] ABSTRACT

A container is produced from a preform which is formed by expansion in the axial and/or radial direction of a hollow blank of originally substantially amorphous material. In the production, the circumference of the preform is reduced by heating of material in the preform body, at least one material portion of the container body being displaced, by means of a mechanical forming device (30), in a direction towards the centre of the preform for forming an outer bounding surface of the container comprising material portions whose distance to the centre axis of the container is less than the distance of corresponding material portions to the centre axis (26) of the preform. An apparatus for producing the container includes the mechanical forming device which, during reforming of the preform into the container, abuts against material in the preform. The mechanical forming device includes a forming portion (33) provided with channels for thermal medium and with a forming surface (37) disposed, under energy exchange with material in the preform, to displace material shrunk by heating of the material towards the centre axis of the preform.

11 Claims, 2 Drawing Sheets

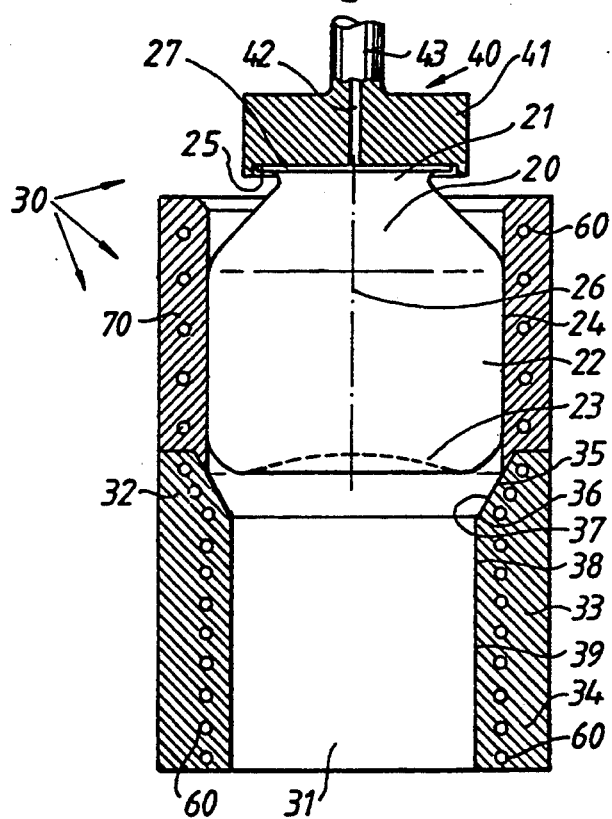
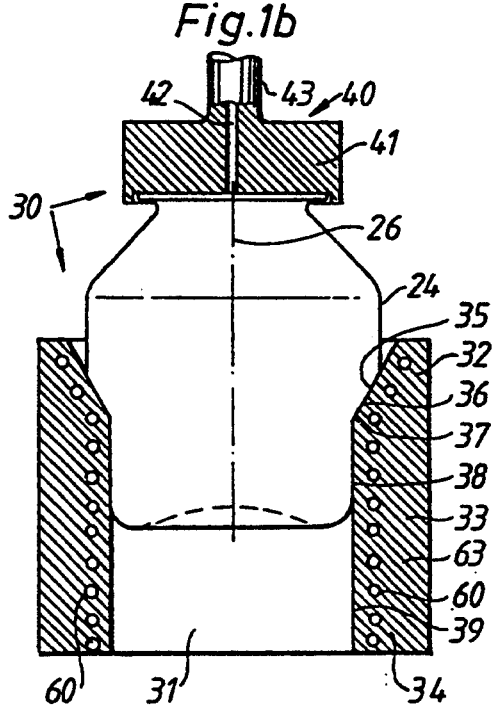
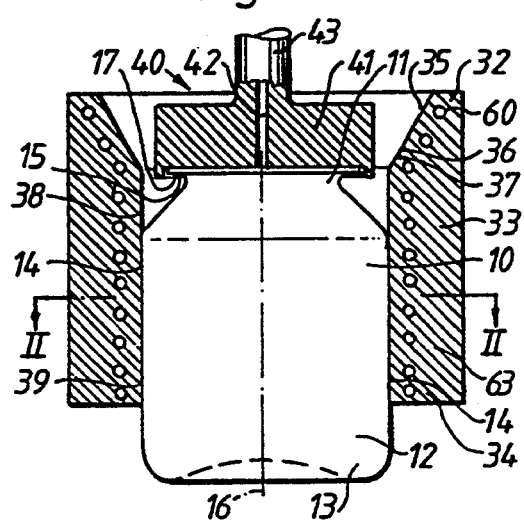

METHOD AND APPARATUS FOR THE PRODUCTION OF A THERMOPLASTIC CONTAINER FROM A PREFORM

The present invention relates to a method and an apparatus for producing a container in accordance with the preamble of the appended independent claims.

There are needs in the art for a container of thermoplastic possessing superior configurational stability also at elevated temperatures. In addition, it is generally required that the container has at least one substantially planar side surface and, in particular, there is a need for a container with, for example, substantially triangular, quadratic, rectangular or other substantially polygonal cross section. Finally, it is necessary that the container possess a superior capability to withstand both partial vacuum and excess pressure within the sealed container, without any resultant troublesome change in shape.

A container possessing the properties disclosed in the foregoing paragraph is eminently suited for a multiplicity of fields of use, for instance for the storage of foods. In particular in practical applications in which pasteurization, hot-filling or sterilization occur, it is necessary that the container, without changing shape, withstand the elevated temperatures involved. It will also be obvious to the skilled reader that, in practical applications in which the container has been filled with, for example, beverages containing, for instance, carbon dioxide or nitrogen gas, high pressures occur in the sealed container both in connection with the filling operation and during subsequent storage. It should particularly be observed that very high pressures occur within a container which is filled with carbonated beverages when such a container is exposed to heating.

As one non-restrictive example of a thermoplastic material for the production of a container for the above-outlined purposes, mention might be made of polyethylene terephthal ate, hereinafter generally abbreviated to PET. Like most other thermoplastic materials, PET is characterized int. al. in that it obtains, by mono and/or biaxial orientation, superior mechanical strength properties, that the material is thermocrystallizable and that its barrier properties are generally sufficient for many practical applications within the food sector.

As has already been briefly disclosed above, the mono and/or biaxial orientation of the thermoplastic material entails that the material obtains the contemplated superior mechanical strength properties, by which is primarily taken to mean a capacity to withstand, without appreciable configurational change, increased internal pressure in those parts of the container in which are included oriented material. In the production of the container, the point of departure is, as a rule, a blank of substantially amorphous material, the blank being expanded in connection with production of the container. On the expansion, the thickness of the material is reduced at the same time as the material is oriented. Normally, only material in the walls of the container body is expanded, the material being, as a rule, given a biaxial orientation. However, in certain practical applications, the material in the mouth or opening portion of the container is also expanded/oriented. On the other hand, in most practical applications, the material in the bottom portion of the container is not expanded/oriented, at least not in the central region of the bottom portion.

As a rule, the non-oriented material portions are thermally crystallized so as to increase configurational stability at both low temperatures and elevated temperatures. In certain practical applications, the non-oriented material portions are, in connection with the thermal crystallization, exposed to external pressure forces (generally mechanical forces) in order to control the crystallization speed. In such instance, a combination of compression forces and temperatures is generally selected which entails that the material thickness undergoes a certain reduction, at least a reduction of a minimum of 1%. This will ensure, on thermal crystallization by abutment against mechanical devices, also good contact between the mechanical devices and the material intended for crystallization. The increased crystallinity obtained as a result of the thermal crystallization, in combination with the material thickness, entails the contemplated mechanical strength properties and the sought-for thermal stability for the container even i n the non-expanded/oriented material regions.

Those portions in the container which consist of oriented material show a tendency to shrink at elevated temperatures. Naturally, this is a major drawback when the container is employed for storing foods, since the containers are, in connection with the filling operation and/or during subsequent handling, exposed to relatively high temperatures, i.e. temperatures which, in certain practical applications, approach 150° C.

The present invention discloses a method and an apparatus for producing containers of thermoplastic material in which the above-disclosed requirements are satisfied and the above-outlined problems are obviated.

The reduction of the circumference of the preform caused by heating according to the invention entails a release of those tensions which have been embodied into the material in connection with orientation of the material. On renewed heating to a temperature corresponding to or slightly less than the temperature of the material in connection with release of the tensions, the material shows no tendency to shrink, for which reason the container retains its shape also in those portions which consist of oriented material.

According to one preferred embodiment of the present invention, the preform is displaced through a passage formed by a mechanical device which heats the plastic material and utilizes the shrinkage and workability of the material at the elevated temperature in order, on the reduction of the circumference of the container body, to realize substantially planar side surfaces of the container body. Since, according to the invention, the passage is of smaller circumference than the outer circumference of the container body, all of those parts of the container body which are to undergo circumferential reduction are brought into reliable abutment against the mechanical device, these parts thereby being heated to the desired elevated temperature. This is determined by the temperature of the abutment-forming surfaces of the mechanical device. It will also be obvious that, because the oriented material is relatively thin, the material will reach the elevated temperature already after a short abutment time.

The present invention will be described in greater detail herein below, with reference to a number of Drawing Figures, in which:

BRIEF DESCRIPTION OF THE DRAWINGS

FIGS. 1a–c show axial cross sections of a first embodiment of an apparatus for producing a container from a preform;

FIG. 1a depicts a preform 20 of thermoplastic material with a mouth portion 21, a preform body 22 disposed between the mouth portion and the bottom portion, and a sealed bottom portion 23. The mouth portion is provided with a mouth edge 25 which, in the embodiment of the preform shown in the Figure, defines an outwardly flared flange 27 of the mouth portion. The centre axis of the preform carries reference numeral 26. The preform body 22 has an outer, substantially cylindrical bounding definition 24 which, in all parts, is located more distally from the centre axis 26 than any part of the mouth portion.

FIG. 1b shows the preform under reforming into a container 10 as illustrated in FIG. 1c. The container 10 has a mouth portion 11, a container body 12 and a sealed bottom portion 13. The mouth portion includes a mouth edge 15 which, in the embodiment illustrated in FIG. 1c, defines an outwardly flared flange 17 of the mouth portion. The centre axis of the container carries reference numeral 16 and the outer bounding definition of the container 12 has reference numeral 14. In the illustrated embodiment, the cross section of the container body is substantially quadratic, but it will be obvious to a person skilled in the art that the present invention is applicable for producing a container of any optional cross section, such as circular, elliptical, polygonal, etc, and also of embodiments in which parts of the bounding definition of the cross section are curved in order, in certain practical applications, to form transitions between mutually adjacent side surfaces of the container.

FIGS. 1a–c also show a mechanical forming device 30 which includes a forming portion 33 forming a central passage 31 which, in the illustrated embodiment, is of substantially quadratic cross section (cf. FIG. 2). Channels 60 for thermal medium, preferably liquid, are provided in the forming portion 33. The forming portion is provided with an in-feed portion 32 and a discharge portion 34, the terms in-feed portion and discharge portion being related to that sequence in which the preform is displaced in relation to the passage during the reforming of the preform into the container (cf. the description below). The in-feed portion includes a guide-in surface 35 and a contact surface 36 for preheating material in the preform. The forming portion 33 includes a forming surface 37, and after-treatment surface 38 and a contact surface 39 for cooling the formed container. It will be obvious to a person skilled in the art that, in one preferred embodiment, the mechanical forming device is provided with thermal insulation which separates parts of the forming device which are set at different temperatures by thermal medium.

Figure 2:
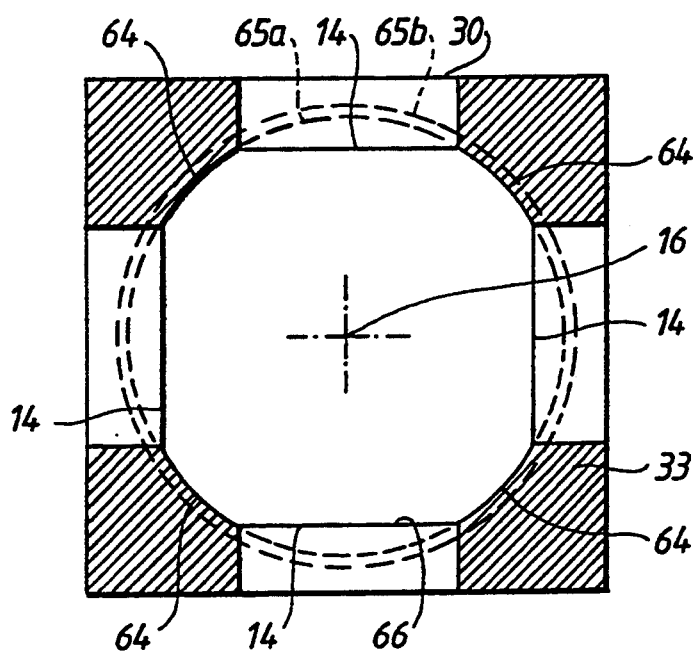
FIG. 2 is a cross section taken along the line II—II in FIG. 1c.

The mechanical forming device also includes a press tool 40 which, by relative displacement in relation to the forming portion 33, is moved to a position within the passage 31 and/or therethrough and thence back to the starting position. The press tool is provided with a press head 41 and, in the illustrated embodiment, with a rod 43 for connection to drive means (not shown on the Drawings). The press head is of a configuration adapted to the mouth portion of the preform, and thereby of the container, for generally substantially sealing abutment against the mouth portion during reforming of the preform into the container. In certain embodiments, a channel 42 for pressure medium places, during the reforming process, the interior of the container in communication with a pressure source (not shown on the Drawings). In certain practical applications, the mechanical forming device 30 also includes a support sleeve 70 disposed in association with the in-feed portion 32 of the forming portion 33. The support sleeve has an inner configuration and circumference corresponding to the cross section of the preform body in order, on displacement of the preform into and through the forming portion 33, to support the preform exteriorly.

It will be apparent from the cross section illustrated in FIG. 2 that the forming portion 33 forms, in the illustrated embodiment, a passage of substantially quadratic cross section. In the transition between mutually adjacent side surfaces 14 of the inner definition of the passage, the corners are rounded for forming curve abutment surfaces 64. In the Figure, the cross section of the preformed body is marked by broken lines 65a, b, while the cross section of the container body is marked by solid lines 66. The broken line 65a marks a preform whose cross section substantially corresponds to a circular periphery, of which the curved abutment surfaces 64 at the corners form part, while the broken line 65b marks a preform of larger cross section.

Figure 3:
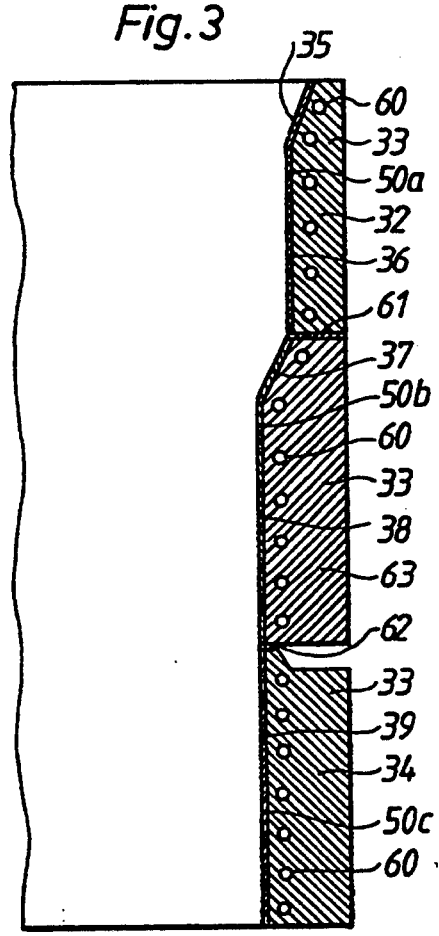
FIG. 3 is an axial cross section corresponding to the cross section in FIG. 1a of an alternative embodiment.

In the embodiment illustrated in FIG. 3, the forming portion 33 is provided with separate and mutually interconnected devices which form, first, the in-feed portion 32 of the forming portion, secondly, an intermediate portion 63 which includes the forming surface 37 and after-treatment surface 38 of the forming portion, and thirdly the discharge portion 34 with its contact surface 39 for cooling the material in the formed container. A coating or a layer 50a–c which consists of material of superior thermal conductivity and of low friction, for example copper or a copper alloy, is, as a rule, provided on the inside of the forming portion 33. Generally, the coating or layer forms all surfaces against which the preform abuts when it is urged through the passage 31, i.e. the guide-in surface 35, the contact surface 36 for preheating, the forming surface 37, the after-treatment surface 38 and the contact surface 39 for cooling. All of the above-disclosed separate parts are provided with channels 60 for thermal medium. A thermal insulation 61 is provided in certain embodiments between the in-feed portion 32 and the intermediate portion 63 and, in certain embodiments, a thermal insulation 62 is also provided between the intermediate portion 63 and the discharge portion 34. It will be obvious that, in certain embodiments, the channels for thermal medium form closed systems for each respective part, which makes possible adjustment of the temperature of each respective part to a predetermined level. At least the discharge portion is set at a temperature deviating from that of other parts, as a rule a lower temperature. Normally, the in-feed portion 32 is at a lower temperature than the intermediate portion 63.

When the apparatus according to any of the embodiments shown on the Drawings is reduced into practice, the preform 20 is placed in relation to the mechanical forming device 30, in a position in which the bottom portion 23 of the preform is located in the region of the in-feed portion 32 of the forming device. By relative displacement of the preform and the forming portion 33, the bottom portion is moved into abutment against the guide-in surface 35 of the in-feed portion, thereafter into contact against the contact surface 36 for preheating of material in the preform, thereafter into contact with the forming surface 37 for reforming of the preform into a configuration (shape) corresponding to that of the container, and passes therefrom further past the after-treatment surface 38 for possible supplementary release of tensions embodied into the plastic material, and thereafter, under continued abutment against the forming portion, past the contact surface 39 for cooling in order, after completed displacement through the passage 31, to depart from the forming portion 33 of the mechanical forming device 30.

The displacement of the preform through the passage 31 and the reforming of the preform into the container realized in connection with this displacement require that the preform be urged through the passage by external forces. This is achieved in that the press tool 40, during abutment against the mouth portion of the preform, is displaced towards the forming portion 33 and through the passage 31 and, in such instance, urges the preform through the passage. It will hereby be ensured that the preform is brought into abutment against the hot forming surface 37 of the forming portion 33 in all of those material regions of the preform which are reformed during the displacement through the passage 31 of the forming portion. It will be obvious that the preform is, during the reforming process, subjected to axially directed forces of a magnitude which may entail that the preform is deformed in that its wall is creased. In practical applications in which such a risk exists, the interior of the container is, as a rule. pressurized using pressure medium which is supplied via the channel 42, and also the support sleeve 70 is, as a rule, disposed in order to contribute, by its outer supporting action, to minimizing the risk of crease formation. In practical applications in which the embodiment illustrated in FIG. 3 is employed, the in-feed portion 32 generally constitutes a supporting member corresponding to the support sleeve 70. The displacement of the preform is adapted to the time which is required for heating of the plastic material so that this reaches a temperature suited for the reforming at the latest in connection with reforming of the preform. This temperature exceeds the glass transition temperature (Tg) of the material.

The rate of displacement of the preform through the passage is adapted to the material properties of the thermoplastic material and to the surface temperature of the contact surfaces of the forming portion, in order, during each phase of the displacement, that the material will attain, by energy exchange with the forming portion 33, a temperature suited for each treatment stage. It is essential that all of those parts of the container body which undergo reforming reach at least the predetermined minimum temperature for release of the tensions embodied during the orientation and reforming before these parts arrive at the cooling surface 39.

In one preferred practical application of the present invention in which the design of the forming portion 33 as illustrated in FIG. 3 is employed, the rate of displacement of the preform is lower in the initial stage (the temperature conditioning) than during its subsequent displacement. The axial length of the in-feed portion 32, and, thereby, the length of the contact surface 36 in the axial direction for preheating is, in one preferred embodiment, selected so as substantially to correspond to the axial length of the essentially cylindrical portion of the container body. The lower rate of displacement of the preform in relation to the forming portion during the first part of the displacement through the passage is, as a rule, selected when the axial length of the in-feed portion is relatively short. It will hereby be ensured that the material in all of those parts of the preform which are to undergo reforming will be heated to such an elevated temperature that the contemplated release of the tensions embodied in the material will be achieved.

In certain practical applications, the axial length of the contact surface 36 is greater than the axial length of the preform body. This is generally combined with an unchanged rate of displacement of the preform on its displacement through the passage 31 of the forming portion 33. In other practical applications, the temperature of the in-feed portion varies such that it is preferably highest most proximal the intermediate portion 63. By adapting the rate of displacement and surface temperatures of the forming portion 33 to one another and to the material thickness of those material portions which are temperature-conditioned, the contemplated effect will be achieved emplying reforming of the preform, heating for releasing inner tensions and cooling in connection with discharge of the formed container. The dimensions of the inner bounding definition of the passage and the maximum temperature to which the material is heated are adapted to one another in order that, during the reforming, the circumference of the preform body and the circumference of the container body, respectively, correspond to the inner circumference of the passage. In certain practical applications, the rate of displacement of the container is reduced under passage of the contact surface 39 for cooling.

As has already been disclosed, the plastic material is, on reforming, at a temperature which exceeds the Tg of the material. In order to achieve this, the mechanical forming device is, in one preferred practical application, at a temperature exceeding the Tg of the plastic material by at least 20° C., preferably by at least 40° C. and generally by at least 60° C.

By way of example of temperatures employed in reforming a preform of PET, mention might be made of a temperature for the abutment surfaces of the intermediate portion 63 of at least 120° C., preferably at least 140° C. and, in certain high temperature applications, at least 160° C. It has proved possible in practice to use temperatures for reforming the preform of PET of as much as in the range of 180–200° C. The temperature employed is always higher—as a rule at least 5° C. higher—than the highest temperature at which the material was adjusted in connection with undergoing the forming process or processes at which the amorphous blank was expanded into the preform. The temperature of the in-feed portion 32 is at least 10–15° C. lower than that of the intermediate portion 63, while the temperature of the discharge portion is, as a rule, lower than the glass transition temperature (Tg) of the material.

The above-described technique discloses a dependable and reliable technique for reforming, by abutment against mechanical forming devices, a preform into a container under reduction of the circumference of the preform and release of tensions embodied in the preform. There will hereby be achieved the contemplated temperature stability of the container, a temperature stability which, on each occasion, is adapted to the maximum temperature which the thermoplastic material in the container may be expected to reach in the future use of the container. Furthermore, the elevated temperature is utilized in connection with reforming of the preform into the container for two different purposes, namely for softening the material and thereby making possible a permanent and temporally stable reforming and for releasing tensions embodied in the material, thereby ensuring that the container does not shrink on being heated.

The above detailed description has referred to but a limited number of embodiments of the present invention, but a person skilled in the art will readily perceive that the present invention encompasses a large number of embodiments without departing from the spirit and scope of the appended claims.

I claim:

1. A method for the production of a container (10) of thermoplastic material, with a mouth portion (11), a container body (12), and a bottom portion (13) from a preform (20) with a mouth portion (21), a bottom portion (23) and a preform body (22), in which the preform has been formed by expansion in the axial, and/or radial direction of a hollow blank of originally substantially amorphous material, comprising the following steps:

forming the preform;
   heating the material in the preform body (12) by abutment against a mechanical device (33) of a mechanical forming device (30) at elevated temperature, thereby reducing the circumference of the preform;
   displacing at least one material portion of the preform body for formation of the container (10), through a passage (31) wholly or partly defined by the mechanical device (33) in a direction towards the centre of the preform;
   forming an outer defining surface (14) of the container with material portions being at a distance to the centre axis (16) of the container less than the distance of corresponding material portions to the centre axis (26) of the preform;
   wherein the mechanical device (33) includes at least one mechanical forming surface (37) which, on displacement of the preform through the passage, displaces material abutting against the forming surface toward a centre axis of the passage.

2. The method as claimed in claim 1, wherein said defining surface (14) is reformed to a substantially planar form.

3. The method as claimed in claim 1, wherein the mechanical device (33) is at a temperature exceeding the glass transition temperature of the thermoplastic material.

4. The method as claimed in claim 1, wherein the mechanical forming device (30) is at a temperature exceeding the glass transition temperature of the thermoplastic material by at least 20° C.

5. The method as claimed in claim 1, wherein the thermoplastic material, on abutment against the mechanical device (33), is heated to a temperature exceeding the maximum temperature at which said material was adjusted before undergoing forming at which the substantially amorphous blank was reformed into the preform.

6. The method as claimed in claim 1, wherein, on abutment against the mechanical device (33), the thermoplastic material is heated to such elevated temperature that the thermoplastic material shrinks in the circumferential direction.

7. The method as claimed in claim 1, wherein the mechanical forming device (30) is at a temperature exceeding the glass transition temperature of the thermoplastic material by at least 40° C.

8. The method as claimed in claim 1, wherein the mechanical forming device (30) is at a temperature exceeding the glass transition temperature of the thermoplastic material by at least 60° C.

9. An apparatus for producing a container (10) of thermoplastic material with a mouth portion (11), a container body (12) and a bottom portion (13) from a preform (20) with a mouth portion (21), a bottom portion (23) and a preform body (22), in which the preform has been formed by expansion in the axial and/or radial direction of a hollow blank or originally substantially amorphous material, and in which the apparatus includes a mechanical forming device (30) which, during reforming of the preform into the container abuts against material in the preform, wherein:

the mechanical forming device (30) includes a forming portion (33) provided with channels for thermal medium, and with a forming surface (37) disposed, under energy exchange with material in the preform, to displace material shrunk by heating or the material toward the centre axis of the preform;
   the forming portion (33) includes an in-feed portion (32) and the forming surface (37) for temperature conditioning of the preform (20) and wherein the in-feed portion (32) is connected to an intermediate portion (63);
   the intermediate portion (63) includes an after-treatment surface (38) for supplementary release of tensions embodied in the plastic material; and
   the intermediate portion (63) is connected to a discharge portion (34) with a contact surface (39) for cooling the formed container (10).

10. Apparatus according to claim 9 wherein the discharge portion comprises an open discharge end through which the formed container is discharged from the apparatus.

11. Apparatus for the production of a container (10) of thermoplastic material, with a mouth portion (11), a container body (12), and a bottom portion (13) from a preform (20) with a mouth portion (21), a bottom portion (23) and a preform body (22), in which the preform has been formed by expansion in the axial and/or radial direction of a hollow blank of originally substantially amorphous material, comprising:

means for forming the preform;
   means for heating the material in the preform body (12) by abutment against a mechanical device (33) of a mechanical forming device (30) at elevated temperature, thereby reducing the circumference of the preform;
   means for displacing at least one material portion of the preform body for formation of the container (10), through a passage (31) wholly or partly defined by the mechanical device (33) in a direction towards the centre of the preform;
   means for forming an outer defining surface (14) of the container with material portions being at a distance to the centre axis (16) of the container less than the distance of corresponding material portions to the centre axis (26) of the preform;
   wherein the mechanical device (33) includes at least one mechanical forming surface (37) which, on displacement of the preform through the passage, displaces material abutting against the forming surface toward a centre axis of the passage.

* * * * *